June 11, 1957  J. L. GRATZMULLER  2,795,443
TORQUE-TRANSMITTING THREADED JOINT
Filed Feb. 5, 1952
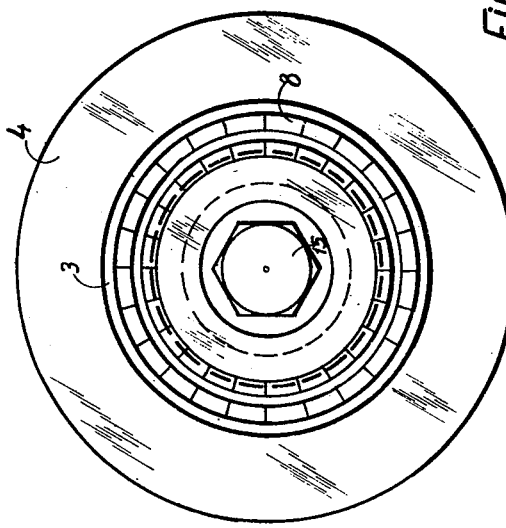
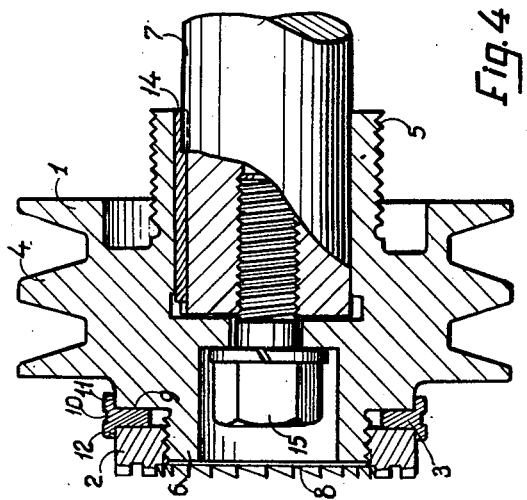
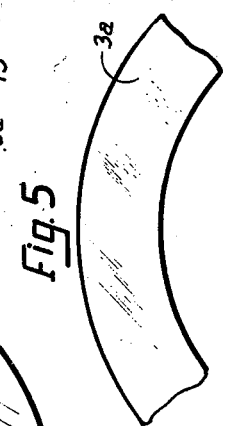
Inventor
J. L. Gratzmuller
By Glascock Downing Nesbold
Attys.

United States Patent Office 2,795,443
Patented June 11, 1957

2,795,443
TORQUE-TRANSMITTING THREADED JOINT

Jean Louis Gratzmuller, Paris, France

Application February 5, 1952, Serial No. 270,011

Claims priority, application France February 13, 1951

7 Claims. (Cl. 287—53)

This invention relates to torque transmitting screwed joints connecting two members, e. g., for mounting the fixed member of an engageable and disengageable claw-coupling on a shaft such as the crank shaft of an internal combustion engine.

The torque-transmitting characteristics of screwed joints are in general adequate, but when subjected to repeated shocks of torque application are liable to be overtightened so that the threads bind and render it difficult, if not impossible, to unscrew one member from the other.

The main object of this invention is to provide means whereby a torque-transmitting screw-threaded joint connecting two members can be freed with ease and certainty for the purpose of unscrewing one member from the other.

According to this invention, a flat metal ring or washer of adequate mechanical strength to withstand the loading to which it is subjected by the applied torque and of easily destructible character is inserted between opposed flat radial faces formed on the members connected by the screwed joint, the internal diameter of said washer being greater than the maximum diameter of the female screw-thread, the joint being further provided with means for centering the washer member in a well centered position with respect to the said members.

According to one form of construction, the said washer is wide enough axially to admit of its being parted by a turning operation, e. g., on a lathe, the tool executing a narrow radial cut, the periphery of the washer being exposed to enable this to be done.

According to another form of construction, the said washer is made of material that can easily be fused, dissolved or disintegrated by thermal or chemical means without damaging the claw or its mounting member, such for example as a low-melting-point metal, e. g., zinc, tin or a so-called "fusible" alloy, of which many varieties are commercially available.

In this case it is only necessary to heat the assemblage to a (local) temperature slightly exceeding the melting point of the metal, when the latter will run out.

For this purpose the destructible ring may have annular flanges engaging cylindrical portions of the members adjacent their opposed radial faces, or one of the members may have an annular flange engaging a cylindrical portion of the other and enclosing the destructible ring—in this case of the fusible, soluble or disintegrable variety—the annular flange being provided with openings or gaps through which the fused, dissolved or disintegrated material of the washer can flow out.

If the periphery of the destructible washer is exposed so that the washer can be parted by a lathe tool it may be provided with a shallow circumferential groove to act as guide for starting the cut.

The invention is especially applicable to screwed joints securing a claw-coupling member on a shaft, or on an intermediate member constituting an adapter detachably secured to a shaft, the latter arrangement being advantageous in enabling standardized claw-coupling members to be fitted to differently shaped and dimensioned shaft ends, and in minimizing the amount of high-grade materials, such as is necessary for the teeth of the claw-coupling, required, because the claw-coupling member being subjected to heavy wear, usually needs to be replaced more than once in the overhaul life of the whole assembly, and the screwed joint is peculiarly liable to jamming on account of repeated shock-loading in torque with high peak values.

The invention is however applicable to any screwed joints subject to severe torque-loading liable to lead to jamming, but which need to be unscrewed from time to time without damaging one at least of the members connected by the joint.

Two forms of construction of the invention as applied to claw-couplings are illustrated by way of example in the accompanying drawings, of which:

Figure 1 is an axial section of a first form of construction;

Figure 2 is an end elevation of the same, viewed from the left hand side of Figure 1;

Figure 3 is an axial section of a second form of construction;

Figure 4 is a fragmentary end elevation, partly sectioned, of the ring 3 of Figures 1 and 2; and Figure 5 is a fragmentary end elevation of the ring 3ª of Figure 3.

Referring to Figures 1, 2 and 4 of the drawings, 7 is the shaft on which a fixed claw member 2 of an engageable and disengageable claw-coupling is mounted by means of an intermediate claw-mounting member 1. The movable claw of the coupling is not illustrated. The intermediate member 1, which includes, as an integral part, a double belt-pulley 4 for driving auxiliary mechanism and an externally threaded boss 5 for accommodating a gear pinion or the like for driving other auxiliary mechanism, is made fast on the shaft 7 by means of a long key 14 and a retaining stud 15. The latter is accessible through a central counter bore in the outer face of the member 1 which is extended to form an externally threaded boss or cylindrical member 6 on which the claw member 2 is screwed, the screw-threaded connection between the claw member and the boss member 6 being coaxial with the claw member and the shaft. The outer face of the claw member 2 is indented, as shown at 8, for engagement by the movable claw, and between the opposite face of the claw member 2 and a shoulder member 9 formed on the member 1, is inserted an easily destructible metallic ring-like washer member 3 whose peripheral part is extended to form annular flanges 11 and 12 which engage respectively with the periphery of the shoulder member 9 of the member 1 and the periphery of the claw member 2 in this way serving to center the washer member in a well centered position with respect to the claw member 2 and the cylindrical member 6. The periphery of the washer member 3 is provided with a shallow circumferential groove 10 which serves as a guide for a parting tool when dismantling the claw member 2.

Since torque applied to the intermediate member 1 by the claw 2 is transmitted to the shaft 7 through the key 14, which, owing to the provision of the extended boss 5, can be adequately long for this purpose and the torque does not, therefore, tend to overtighten the threads of the retaining stud 15, there will be no difficulty in extracting the stud 15 and removing the intermediate member 1 from the shaft when necessary. Repeated applications of heavy torque will, however, cause the claw 2 to bind on the threads of the boss 6 which would make it difficult, if not impossible, to unscrew the claw 2 from the boss directly; but by mounting the intermediate member 1, after removal from the shaft 7, on a lathe and making a deep narrow radial cut through the ring 3, using the groove 10 as a guide for the lathe tool in starting the cut, the ring 3 can be parted into two portions and easily extracted, thus releasing the binding stress between the threads of the claw 2 and of the boss 6, thus enabling the claw 2 to be unscrewed from the boss without difficulty. In practice, I have found that it is usually unnecessary to cut completely through the ring 3, an incomplete but deep cut sufficing to relieve the binding of the claw 2 on the boss 6 sufficiently to enable the claw to be easily unscrewed.

The form of construction illustrated in Figures 3 and 5, while in other respects similar to that illustrated in Figures 1, 2 and 4, differs from the former construction in that the ring of destructible metal, in this case designated 3a, is made of a metal of low-melting point, such as zinc, tin or a so-called "fusible" alloy, and its periphery is flush with that of the fixed claw 2. The intermediate claw-mounting member 1 is provided with an annular flange 16 extending from the shoulder 9 and engaging the periphery of the claw 2 to the boss 6. Flange 16 encloses the ring 3a and is provided with gaps or openings 13 through which the metal of the ring 3a can escape when fused by raising the temperature of the assemblage to a value slightly above the melting point of the metal of ring 3a, such temperature not being high enough to cause any permanent damage to the intermediate member 1 or to the claw 2.

What is claimed is:

1. The combination with a body including an externally threaded member, a radially extending circular shoulder member at the inner end of the threaded member and a co-axial internally threaded member to form a torque-transmitting screwed joint, of a washer member of adequate mechanical strength to withstand the loading to which it is subjected by the applied torque, loosely interposed between the internally threaded member and the shoulder member, the said washer member having a substantial greater internal diameter than that of the internally threaded member, means carried by one of said members for centering the washer member in a well centered position with respect to the externally and internally threaded members, and means associated with said centering means to facilitate destruction of said washer member when the same is clamped between said externally and internally threaded members.

2. The combination according to claim 1, in which said centering means consists of oppositely extending flanges on the outer periphery of the washer member for respectively engaging the outer surfaces of the shoulder member and the internally threaded member.

3. The combination according to claim 1, in which said centering means consists of a longitudinally extending flange portion formed on the outer periphery of said shoulder member for engagement with the outer periphery of the washer and with the outer periphery of the internally threaded member.

4. The combination according to claim 1, in which the washer member is formed of a metal capable of being easily fused by thermal action.

5. The combination with an externally threaded member having a radially extending circular shoulder at one end of the external thread and a coaxial internally threaded cylindrical member threadedly engageable on said first mentioned member at the other end of said external thread to form a torque-transmitting screwed joint, said cylindrical member having substantially the same external diameter as said circular shoulder, of a metal washer member of adequate mechanical strength to withstand the loading to which it is subjected by the applied torque interposed between said cylindrical member and said circular shoulder, said washer member having a substantial greater internal diameter than that of said cylindrical member, means carried by one of said members for maintaining said washer member at all times in a well centered position with respect to said externally threaded member, and means associated with said centering means to facilitate reduction of the thickness of the washer member when the same is clamped between said shoulder member and said cylindrical member.

6. The combination according to claim 5, in which said centering means is constituted by two longitudinally extending flange portions formed on the outer periphery of said washer member, one of said flange portions being engageable with the outer periphery of said circular shoulder so as to be carried thereby and the other flange portion being engageable with the outer periphery of said cylindrical member, said means to facilitate reduction of the said thickness of the washer member consisting of a circumferential groove provided on said washer member between said flange portions and serving as a guide for the cutter member of a suitable parting tool.

7. The combination according to claim 5, in which said centering means is constituted by a longitudinally extending flange portion formed on the outer periphery of said shoulder member, said flange portion being engageable with the outer periphery of said washer member and with the outer periphery of said cylindrical member, said means to facilitate reduction of the said thickness of the washer consisting of at least one aperture formed in said flange portion to allow the compressed material of the washer to escape when the same is submitted to a destroying action.

References Cited in the file of this patent

UNITED STATES PATENTS

| | | |
|---|---|---|
| 706,265 | Smalley | Aug. 5, 1902 |
| 793,372 | Heilrath | June 27, 1905 |
| 919,034 | LaMotte | Apr. 20, 1909 |
| 1,156,397 | Dierdorf | Oct. 12, 1915 |
| 1,398,020 | Holley | Nov. 22, 1921 |
| 1,433,860 | Spencer | Oct. 31, 1922 |
| 1,567,649 | Hultgren | Dec. 29, 1925 |
| 1,652,648 | Swangren | Dec. 13, 1927 |
| 1,928,769 | Teetor | Oct. 3, 1933 |
| 1,931,633 | Symons | Oct. 24, 1933 |
| 1,953,297 | Good | Apr. 3, 1934 |
| 2,078,471 | Tinnerman | Apr. 27, 1937 |